United States Patent
Strom et al.

(10) Patent No.: US 11,067,417 B2
(45) Date of Patent: Jul. 20, 2021

(54) AVERAGING PITOT TUBE HAVING AN ADJUSTABLE RESONANT FREQUENCY

(71) Applicant: Rosemount Inc., Shakopee, MN (US)

(72) Inventors: Gregory Robert Strom, Boulder, CO (US); Changyu Han, Beijing (CN)

(73) Assignee: ROSEMOUNT INC., Shakopee, MN (US)

( * ) Notice: Subject to any disclaimer, the term of this patent is extended or adjusted under 35 U.S.C. 154(b) by 140 days.

(21) Appl. No.: 16/493,506

(22) PCT Filed: Jun. 14, 2019

(86) PCT No.: PCT/CN2019/091284
§ 371 (c)(1),
(2) Date: Sep. 12, 2019

(87) PCT Pub. No.: WO2020/248231
PCT Pub. Date: Dec. 17, 2020

(65) Prior Publication Data
US 2020/0393275 A1    Dec. 17, 2020

(51) Int. Cl.
*G01F 1/46* (2006.01)
*G01F 1/684* (2006.01)

(52) U.S. Cl.
CPC .............. *G01F 1/46* (2013.01); *G01F 1/684* (2013.01); *G01F 1/6842* (2013.01)

(58) Field of Classification Search
CPC .................................. G01F 1/46; G01F 1/684
USPC .............................. 73/112.01, 861.65, 861.67
See application file for complete search history.

(56) References Cited

U.S. PATENT DOCUMENTS

| 7,836,780 | B2 | 11/2010 | Garnett et al. |
| 9,250,108 | B2 | 2/2016 | Wiklund |
| 9,702,743 | B2 | 7/2017 | Strom et al. |
| 2005/0217389 | A1 | 10/2005 | Foster |
| 2011/0107847 | A1* | 5/2011 | Strom ............... G01F 1/46 73/861.24 |
| 2011/0252881 | A1 | 10/2011 | Glatzel et al. |
| 2011/0290033 | A1 | 12/2011 | Flögel et al. |

(Continued)

FOREIGN PATENT DOCUMENTS

CN     105486359 A     4/2016

OTHER PUBLICATIONS

Transmittal, International Search Report and Written Opinion for International Application No. PCT/CN2019/091284, dated Mar. 12, 2020, 10 pages.

(Continued)

*Primary Examiner* — Eric S. McCall
(74) *Attorney, Agent, or Firm* — Westman, Champlin & Koehler, P.A.

(57) ABSTRACT

An averaging pitot tube probe assembly for use in sensing a parameter of a fluid flow in a process vessel includes an averaging pitot tube probe extending through the process vessel. The probe includes a first end extending through a first opening in the process vessel, and a second end extending through a second opening in the process vessel. A fixed mount secures the first end in a fixed position relative to the process vessel. A tensioning mount includes a tensioner that is attached to the second end of the probe and is configured to adjust a tension in the probe, and thereby adjust a resonant frequency of the probe.

20 Claims, 6 Drawing Sheets

(56) References Cited

U.S. PATENT DOCUMENTS

| | | | |
|---|---|---|---|
| 2014/0260658 A1* | 9/2014 | Strom | G01F 1/46 |
| | | | 73/861.01 |
| 2014/0260671 A1 | 9/2014 | Stehle | |
| 2015/0090050 A1* | 4/2015 | Wiklund | G01F 1/37 |
| | | | 73/861.65 |
| 2015/0115105 A1* | 4/2015 | Renno | B64D 15/20 |
| | | | 244/134 F |
| 2016/0091355 A1 | 3/2016 | Mesnard et al. | |

OTHER PUBLICATIONS

Rosemount, Dimensional Drawing, "Flanged w/Opposite Side Support," Model 585, Drawings No. 00585-1000, 00585-1000, Boulder, CO, dated Mar. 24, 2009, 6 pages, dated Mar. 24, 2009.

"The Rosemount Annubar Flowmeter Series," Reference Manuel 00809-0100-4809, Rev DA, dated Sep. 2015, 268 pages.

The Rosemount Annubar Flowmeter Series, "The Value of Innovation Realized," Flyer 00803-0100-6113 Rev CB, 7 pages, dated Jan. 2012.

* cited by examiner

US 11,067,417 B2

AVERAGING PITOT TUBE HAVING AN ADJUSTABLE RESONANT FREQUENCY

CROSS-REFERENCE TO RELATED APPLICATION

This Application is a Section 371 National Stage Application of International Application No. PCT/CN2019/091284, filed Jun. 14, 2019, not yet published, the contents of which are hereby incorporated by reference in their entirety.

FIELD

Embodiments of the present disclosure relate to industrial process measurement systems that utilize an averaging pitot tube probe inserted within a process fluid flow and, more particularly, to a tension-adjustable mount for averaging pitot tube probes.

BACKGROUND

Safe, accurate, and cost-effective fluid measurements are important to a wide range of industrial and scientific processes. Many of these applications require measurements using averaging pitot tube probes that are inserted into the process fluid and facilitate flow rate measurements of the process fluid, for example.

Averaging pitot tube probes are subject to a number of stress factors including flow-induced vibrations. Flow-induced vibrations typically arise as a result of vortex shedding and other turbulent wake field effects, which generate periodically alternating forces on the probe. These forces cause the averaging pitot tube probe to oscillate back and forth or vibrate, increasing mechanical stress and reducing service life for the probe.

When flow-induced vibrations occur near a natural resonant frequency of the averaging pitot tube probe, the magnitude of the forced resonant oscillations of the probe causes significant wear of the probe. Such wear can lead to early catastrophic failure of the probe particularly when combined with other stresses, such as high drag forces, corrosion, fatigue, or erosion of the structure.

SUMMARY

Embodiments of the present disclosure are generally directed to an averaging pitot tube probe assembly having an averaging pitot tube probe for use in sensing a parameter of a fluid flow in a process vessel, and a method of adjusting a resonant frequency of an averaging pitot tube probe of an industrial process sensing device. One embodiment of the averaging pitot tube probe assembly includes an averaging pitot tube probe extending through the process vessel. The probe includes a first end extending through a first opening in the process vessel, and a second end extending through a second opening in the process vessel. A fixed mount secures the first end in a fixed position relative to the process vessel. A tensioning mount includes a tensioner that is attached to the second end of the probe and is configured to adjust a tension in the probe, and thereby adjust a resonant frequency of the probe.

In one embodiment of the method, a first end of the averaging pitot tube probe extending through a first opening of the process vessel is supported in a fixed position relative to the process vessel using a fixed mount. A second end of the probe extending through a second opening of the process vessel is supported using a tensioning mount. The resonant frequency of the probe is adjusted by adjusting a tension of the probe using a tensioner of the tensioning mount.

Another embodiment of the present disclosure is directed to a probe assembly includes a probe extending through a process vessel. The probe includes a first end extending through a first opening in the process vessel, and a second end extending through a second opening in the process vessel. A fixed mount secures the first end in a fixed position relative to the process vessel. A tensioning mount includes a tensioner that is attached to the second end of the probe and is configured to adjust a tension in the probe, and thereby alter a resonant frequency of the probe. An adjustment mechanism of the tensioner includes a first member having a threaded exterior surface and a second member having a threaded socket that receives the threaded exterior surface of the first member. A bias member of the tensioner is configured to flex relative to the process vessel based on the tension in the probe.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION OF ILLUSTRATIVE EMBODIMENTS

Figure 1:
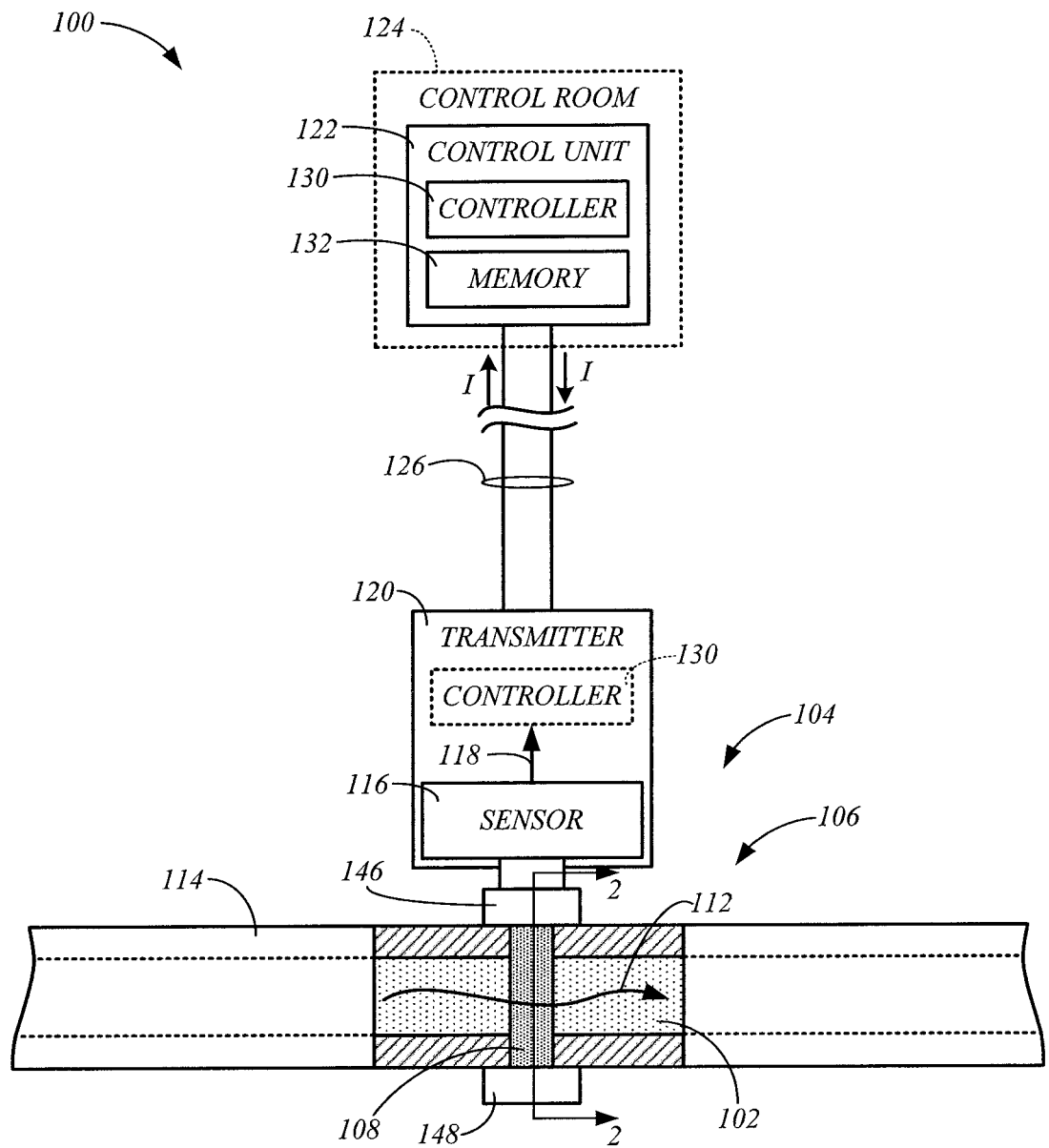
FIG. 1 is a simplified diagram of an exemplary industrial process measurement system, in accordance with embodiments of the present disclosure.

Embodiments of the present disclosure are described more fully hereinafter with reference to the accompanying drawings. Elements that are identified using the same or similar reference characters refer to the same or similar elements. The various embodiments of the present disclosure may be embodied in many different forms and should not be construed as limited to the particular embodiments set forth herein. Rather, these embodiments are provided so that this disclosure will be thorough and complete, and will fully convey the scope of the present disclosure to those skilled in the art.

FIG. 1 is a simplified diagram of an exemplary industrial process measurement system 100, in accordance with embodiments of the present disclosure. The system 100 may be used in the processing of a process fluid 102, such as a liquid or a gas, to transform the process fluid 102 from a less valuable state into more valuable and useful products, such as petroleum, chemicals, paper, food, etc. For example, an oil refinery performs industrial processes that can process crude oil into gasoline, fuel oil, and other petrochemicals.

The system 100 includes an industrial process sensing or measuring device 104 that includes a probe assembly 106 having a probe 108 that is placed within a flow 112 of the process fluid 102 contained in a process vessel 114, such as a pipe. The probe 108 may be configured for use in measuring or sensing a parameter of the process fluid 102 using one or more sensors 116. The parameter of the process fluid 102 may be a flow rate of the fluid flow 112, a temperature of the fluid 102, or other process parameter. The one or more sensors 116 may generate one or more output signals 118 that indicate the sensed parameter. If necessary, the output signals 118 may be processed to determine desired process information. For example, a differential pressure indicated by an output signal 118 from a differential pressure sensor 118 may be processed to determine a flow rate of the fluid flow 112 using conventional techniques.

In some embodiments, the system 100 includes a transmitter 120 that includes the sensors 116 and is configured to process the output signals 118 as necessary to generate process information (e.g., temperature, flow rate, etc.) relating to the fluid flow 112, and communicate the process information over a suitable wired or wireless communication link. The transmitter 120 may be configured to transmit the parameter information to a control unit 122 (e.g., computing device), which may be remotely located from the transmitter 120 in a control room 124, for example, as shown in FIG. 1. The control unit 122 may be communicatively coupled to the transmitter 120 over a suitable physical communication link, such as a two-wire control loop 126, or a wireless communication link. Communications between the control unit 122 and the transmitter 120 may be performed over the control loop 126 in accordance with conventional analog and/or digital communication protocols.

A controller 130 may represent multiple controllers of the system 100, such as controllers of the device 104, the transmitter 120, and the control unit 122, for example. The controller 130 includes one or more processors (i.e., microprocessor, central processing unit, etc.) that perform one or more functions described herein in response to the execution of instructions, which may be stored locally in non-transitory computer readable media or memory 132. The memory 132 may represent memory of the control unit 122, memory of the transmitter 120, and/or memory of the device 104. Any suitable patent subject matter eligible computer readable media or memory may be utilized for the memory 132 including, for example, hard disks, CD-ROMs, optical storage devices, or magnetic storage devices. Such computer readable media or memory do not include transitory waves or signals.

The controller 130 may also represent other conventional circuitry of the transmitter 120, the device 104 and the control unit 122, such as data processing components, data communications components, and/or other components, for example.

The process assembly 106 supports the probe 108 such that it is exposed to the process fluid flow 112 traveling through the process vessel 114. As mentioned above, the probe 108 may represent different types of probes that are used in process parameter sensing or measuring operations performed by the device 104. In some embodiments, the device 104 is in the form of a flow rate measurement device, and the probe 108 is inserted in the fluid flow 112 to perform a flow rate measurement.

In one example, the probe 108 is an averaging pitot tube probe that is used for flow rate measurements. The pitot tube form of the probe 108 may be used to sense an upstream (or "stagnation") pressure of the fluid flow 112, and a downstream (including "static" or "suction") pressure to produce a differential pressure value that is related to the flow rate of the fluid 102 impacting the averaging pitot tube probe 108. The averaging pitot tube probe 108 may include pressure ports leading to fluid plenums in the pitot tube probe and impulse lines may be used to transmit the fluid pressures from the plenums to one of the sensors 116, which may be in the form of a differential pressure sensor, in accordance with conventional averaging pitot tube probes. An output 118 from the sensor 116 indicating the sensed differential pressure may be used to calculate a flow rate of the fluid 102. For example, the output signal 118 indicating the sensed differential pressure may be processed using conventional techniques to determine the velocity of the fluid flow 112, such as by the controller 130. Exemplary averaging pitot tube probes include those used in the Annubar® Flowmeter Series manufactured by Rosemount® Inc., such as the 3051SFA series.

Figure 2:
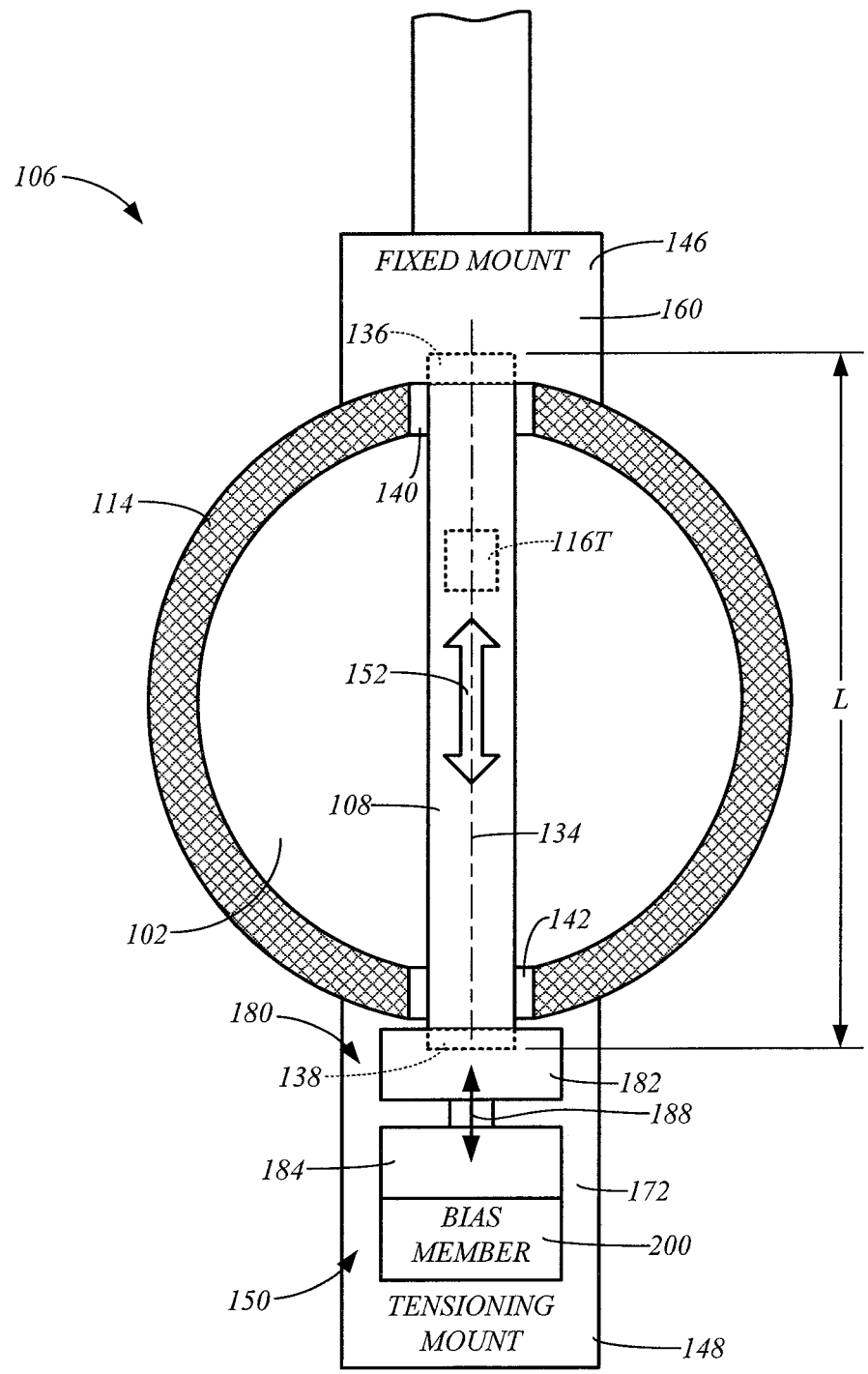
FIG. 2 is a simplified cross-sectional view of an exemplary averaging pitot tube probe assembly taken generally along line 2-2 of FIG. 1, in accordance with embodiments of the present disclosure.
Figure 3:
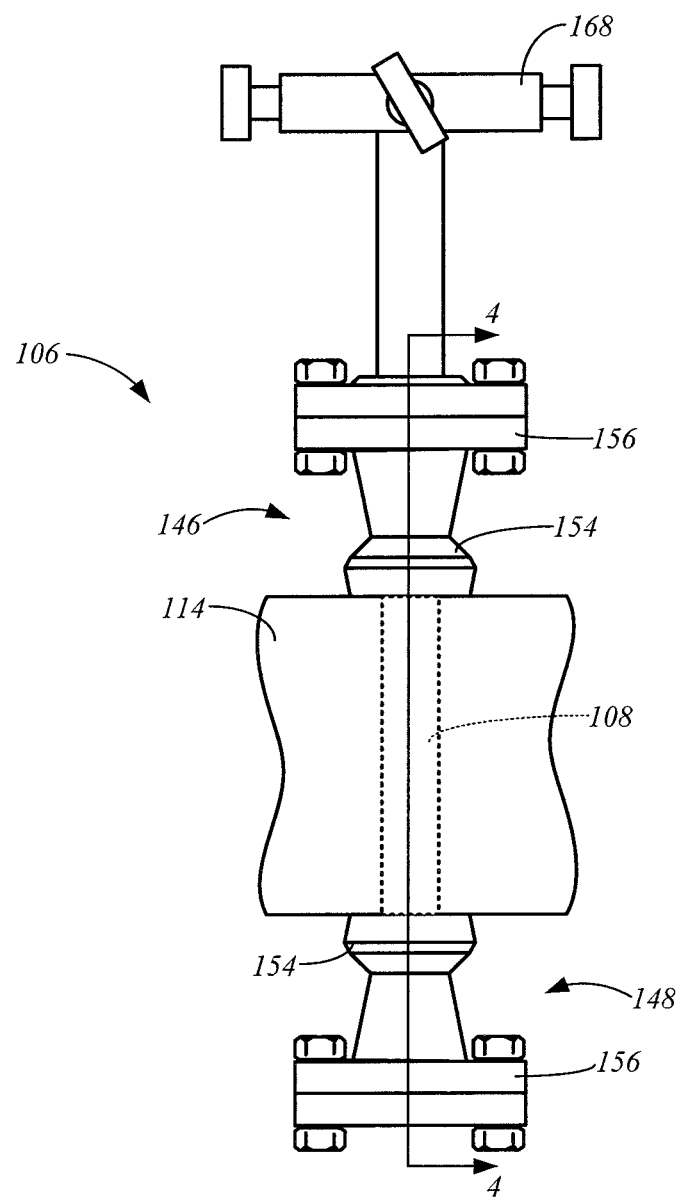
FIG. 3 is a simplified side view of an exemplary averaging pitot tube probe assembly, in accordance with embodiments of the present disclosure.
Figure 4:
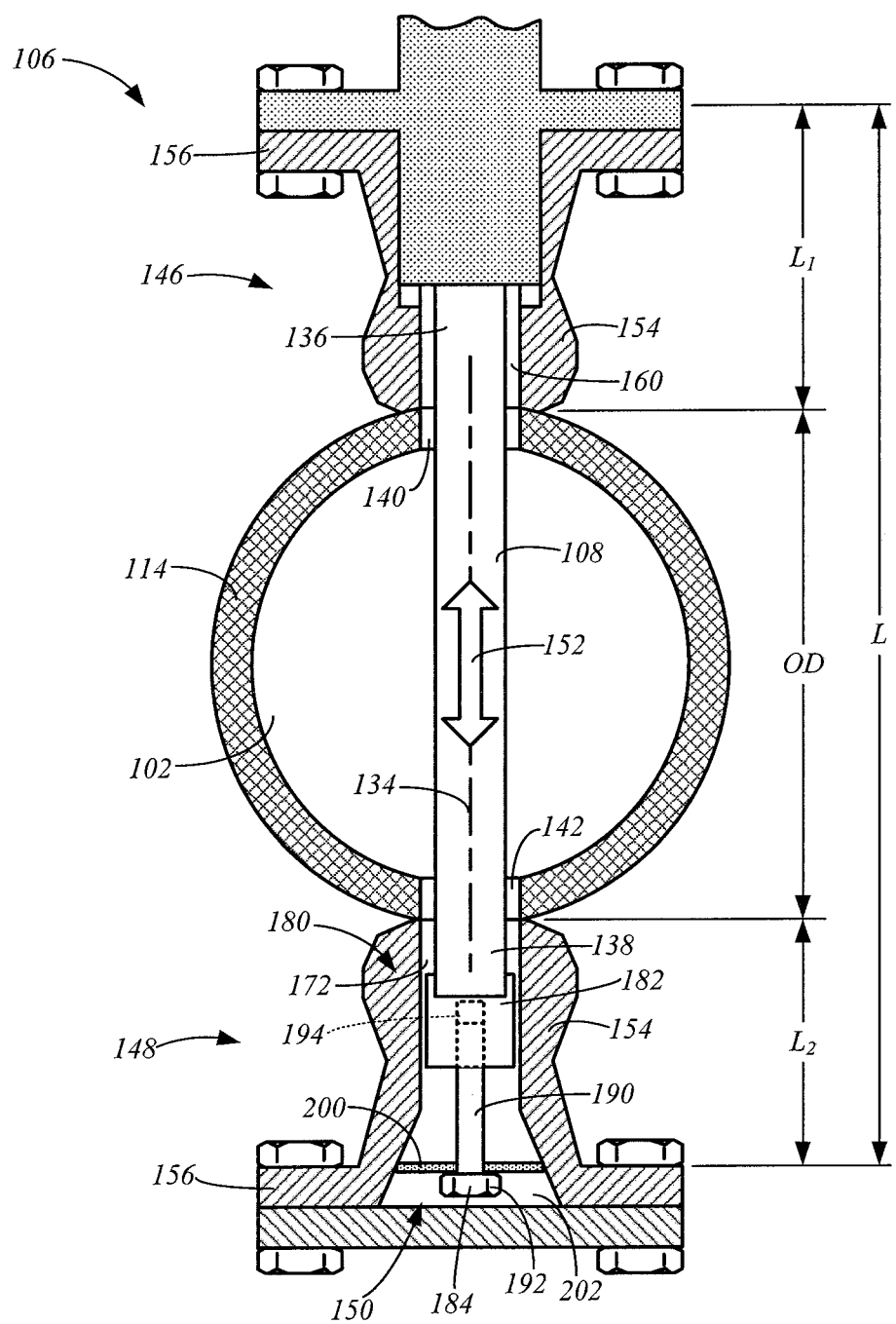
FIG. 4 is a simplified side cross-sectional view of the averaging pitot tube probe assembly of FIG. 3 taken generally along line 4-4 of FIG. 3, in accordance with embodiments of the present disclosure.

FIG. 2 is a simplified cross-sectional view of an exemplary averaging pitot tube probe assembly 106 taken generally along line 2-2 of FIG. 1, FIG. 3 is a simplified side view of an exemplary averaging pitot tube probe assembly 106, and FIG. 4 is a simplified side cross-sectional view of the probe assembly 106 of FIG. 3 taken generally along line 4-4 of FIG. 3, in accordance with embodiments of the present disclosure.

As discussed above, the placement of the averaging pitot tube probe 108 within the fluid flow 112 (FIG. 1) subjects the probe 108 to flow-induced oscillation forces corresponding to the wake frequency at which vortices are shed by the probe 108. The wake frequency is a function of the fluid velocity (V), the width (d) of the probe 108, and the Strouhal number (s), in accordance with the following equation:

$$f_{WAKE} = sV/d.$$

At a critical fluid velocity, this frequency overlaps with the resonant frequency of the probe 108, which is the natural frequency of the mechanical structure, a destructive vibration may be created that can lead to high-magnitude oscillations of the probe 108, which can lead to a structural failure. Conventional solutions to probe vibrations involve increasing the strength of the probe 108 by thickening the walls of the probe 108, or adding specialized structures to the probe 108. These solutions increase manufacturing costs and expand the probe's size and weight. Additional costs may include a decrease in sensitivity.

Embodiments of the present disclosure relate to techniques for addressing flow-induced oscillation forces on an averaging pitot tube probe 108 through probe resonant frequency adjustment. Specifically, embodiments of the present disclosure facilitate an adjustment to the resonant frequency of the probe 108 to a frequency that is outside the anticipated wake frequency that the probe 108 is likely to be subjected to in a given application, to thereby avoid the most destructive flow-induced oscillation forces at the resonant frequency of the probe 108. As a result, the robustness of the probe 108 may be increased relative to conventional probes while mitigating manufacturing costs and probe weight, in addition to facilitating other benefits.

In some embodiments of the averaging pitot tube probe assembly 106, the probe 108 extends through the process vessel 114 along a longitudinal axis 134, and opposing ends 136 and 138 of the probe 108 extend through openings 140 and 142 in a section of the process vessel 114, as shown in FIG. 2. The end 136 of the probe 108 is supported by a fixed mount 146, and the end 138 is supported by a tensioning mount 148. The fixed mount 146 generally fixes the position of the probe end 136 relative to the process vessel 114, and may comprise a suitable conventional mount. The tensioning mount 148 includes a tensioner 150 that is attached to the probe end 138 and is configured to adjust the tension in the probe 108, which is represented by arrow 152 and is oriented along the axis 134.

The resonant frequency of the probe is generally related to the tension 152 of the probe by the following equation:

$$f_{RESONANCE} = C\sqrt{\frac{gEI_L}{wL^4}} * \sqrt{1 + \frac{F_{Tension}L^2}{\pi^2 EI_L}}$$

where C is the modal constant of the structure, g is gravitational acceleration, E is the modulus of elasticity of the material forming the structure, $I_L$ is the moment of inertia of the structure, w is the unit weight of the structure, L is the length of the structure between the supported ends 136 and 138, and $F_{Tension}$ is the tension 152 of the probe 108, such as that applied using the tensioning mount 148. As a result, the resonant frequency of the probe 108 may be adjusted by adjusting the tension 152 of the probe 108 using the tensioner 150, such as to a value that is higher or lower than the anticipated wake frequency.

When the outer diameter OD of the process vessel is relatively small, the resonant frequency of the probe 108 may be increased by shortening the length $L_1$ between the support of the probe end 136 and the process vessel 114, and the length $L_2$ between the support of the probe end 138 and the process vessel 114, which are shown in FIG. 4. This can be achieved by using a shorter fixed mount 146 and/or a shorter tensioning mount 148 (e.g., shorter weld mounts), for example.

The fixed and tension mounts 146 and 148 may each form a seal around the corresponding openings 140 and 142 in the process vessel 114, as indicated in FIG. 4. In some embodiments, the fixed and tensioning mounts 146 and 148 may each include a mount 154 that forms a seal at the corresponding pipe openings 140 and 142, such as a conventional weld-o-let or weld mount, for example. The fixed and tensioning mounts 146 and 148 may also include suitable structures, such as flanges 156, which may be integral with, or welded to the mounts 154, for forming a seal or connecting to other industrial process components, such as a transmitter module, for example.

Figure 5:
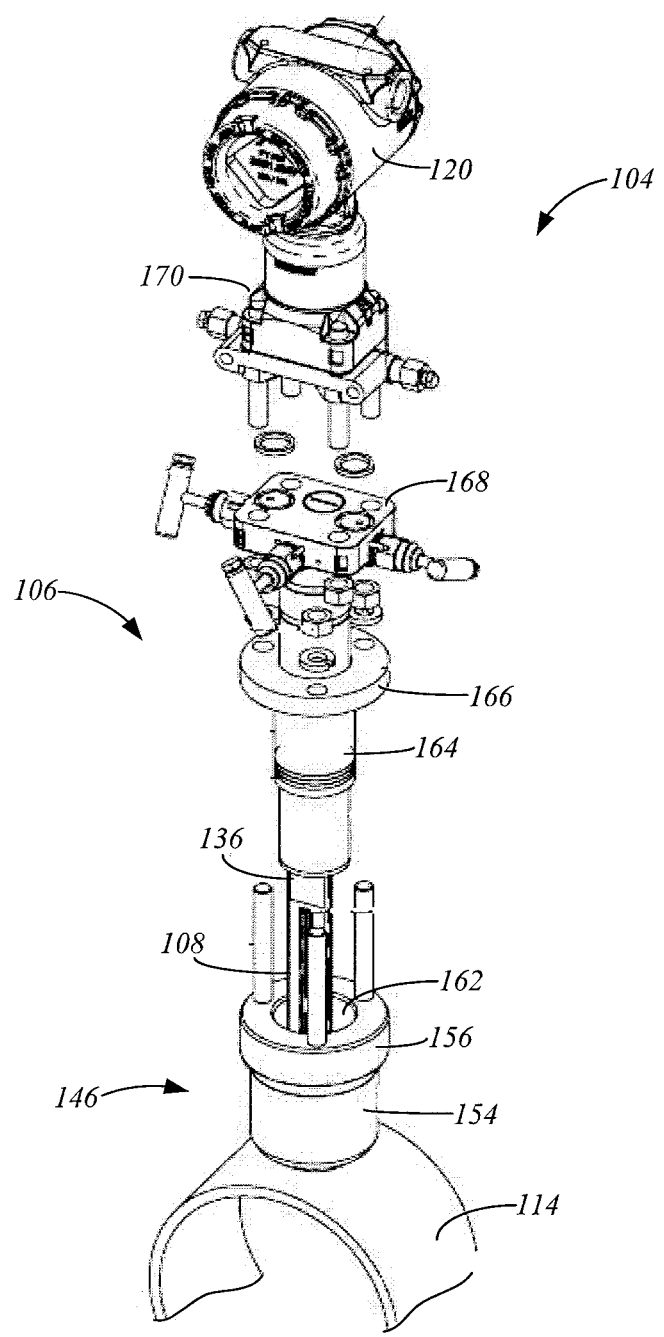
FIG. 5 is an exploded isometric view of an exemplary averaging pitot tube probe assembly coupled to a process transmitter.

The fixed mount 146 may include an interior cavity 160 that receives the probe end 136, as shown in FIGS. 2 and 4. FIG. 5 is an exploded isometric view of an exemplary probe assembly 106 in which the fixed mount end 136 of the averaging pitot tube probe 108 is coupled to a process transmitter 120. In some embodiments, a socket 162 of the mount 154 receives a compatible cylinder 164 that is attached to the end 136 of the probe 108. A suitable seal may be formed between the flange 156 of the mount 154 and a flange 166 attached to the cylinder 164 to prevent process fluid leaks. The probe end 136 may also include a flange for coupling to a manifold 168. Pressures from locations within the averaging pitot tube probe 108 may be routed through the end 136 and the manifold 168 to sensors 116 (e.g., differential pressure sensor) located in a sensor housing 170, which is attached to the transmitter 120. The transmitter 120 may receive the output signals 118 (FIG. 1) from the sensors 116, process the signals 118 to obtain desired process information (e.g., flow rate), and communicate the process information to the control unit 122, for example.

In some embodiments, the tension mount 148 includes an interior cavity 172 that receives the probe end 138, as shown in FIGS. 2 and 4. Additionally, the tensioner 150 may be contained within the interior cavity 172 of the tensioning mount 148.

In some embodiments, the tensioner 150 includes an adjustment mechanism 180 that includes cooperating threaded members 182 and 184, as shown in FIG. 2. The member 182 is attached to the probe end 138, and the member 184 extends distally along the axis 134 from the member 182 and the probe end 138. One of the members 182 or 184 includes a threaded exterior surface (e.g., a screw, bolt, etc.), and the other of the members 182 or 184 includes a threaded socket (e.g., nut, bore, etc.), in which the threaded exterior surface is received. Rotation of the member 184 relative to the member 182 drives movement of the members 182 and 184 either toward or away from each other, as indicated by arrow 188, thereby decreasing or increasing the tension 152 in the probe 108. For example, the member 182 may comprise a threaded rod 190 that is attached to the probe end 138 and is received in a threaded socket 192 (e.g., nut) of the member 184, as shown in FIG. 4. Rotation of the nut 192 about the axis 134 can either reduce or increase the tension 152 in the probe 108. Alternatively, the member 184 may include the rod 190 in the form of a bolt, the threaded end of which is received within a threaded socket 194 (phantom lines) of the member 182, for example.

In some embodiments, the probe end 138 is not held in a fixed position relative to the process vessel 114. One purpose for this is to avoid undesirable changes in the tension 152 in the probe 108 caused by thermal expansion or contraction of the probe 108 and the process vessel 114.

In some embodiments, the tensioner includes a bias member 200 (FIG. 2) that is connected to the probe end 138 and is configured to flex relative to the process vessel 114 in response to the tension 152 in the probe 108. This allows the probe assembly 106 to accommodate thermal expansion and contraction of the probe 108 and the process vessel 114, while substantially maintaining the desired tension 152 in the probe 108 set by the tensioner 150. Thus, the bias member 200 allows the probe end 138 to move relative to the fixed end 136, while maintaining the desired tension level. Accordingly, this configuration avoids the generation of potentially damaging tensile forces in the probe 108 that could occur if the probe end 138 was held in a fixed position relative to the process vessel 114 and the fixed end 136.

The bias member 200 may take on any suitable form. In some embodiments, the bias member 200 includes a leaf spring, a star washer, a coil spring, or another suitable flexible spring-like member. In the exemplary assembly shown in FIG. 4, a bias member 200 in the form of a leaf spring is supported within the interior cavity 172 of the tension mount 148 using any suitable technique. For example, the tension mount 148 may include a conical opening 202, in which a disc-shaped bias member 200 (e.g., leaf spring) may be supported. Alternatively, the interior cavity 172 of the tensioning mount 148 may include a beveled interior diameter or shoulder for supporting the leaf spring, star washer or other bias member 200. Other techniques for supporting the bias member 200 may also be used.

In some embodiments, the bias member 200 is connected to the member 184 of the tensioner 150, such that an increase in the tension 152 in the probe causes the bias member 200 to flex toward the process vessel 114. In some embodiments, the member 184 of the tensioner 150 passes through the bias member 200, as shown in FIG. 4.

Figure 6:
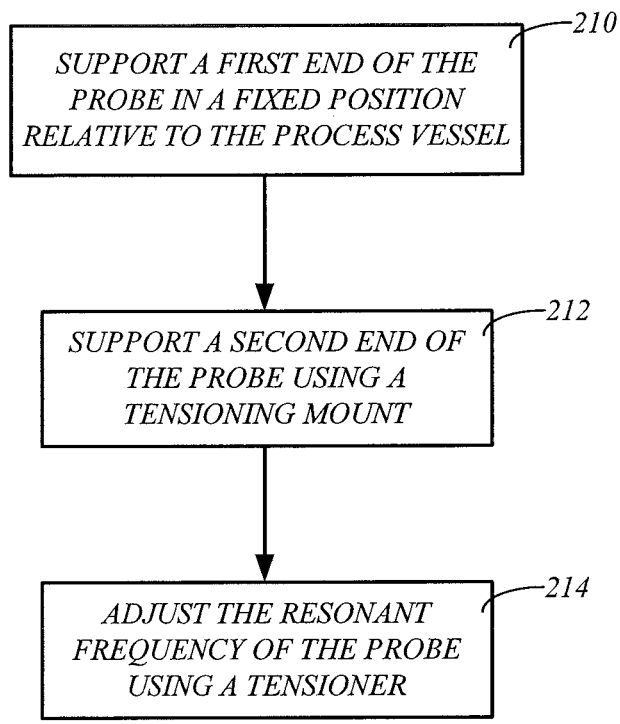
FIG. 6 is a flowchart illustrating an exemplary method of adjusting a resonant frequency of an averaging pitot tube probe of an industrial processing sensing device for sensing a parameter of a process fluid flow in a process vessel, in accordance with embodiments of the present disclosure.

FIG. 6 is a flowchart illustrating an exemplary method of adjusting a resonant frequency of an averaging pitot tube probe 108 of an industrial process sensing or measuring device 104 for sensing a parameter of a process fluid flow 112 in a process vessel 114, in accordance with embodiments of the present disclosure. In some embodiments, the averaging pitot tube probe 108 is a component of a probe assembly 106 formed in accordance with one or more embodiments described herein.

At 210 of the method, a first end 136 of the probe 108 is supported in a fixed position relative to the process vessel 114, as shown in FIG. 2. This may involve extending the end 136 through an opening 140 in the process vessel 114, and securing the end 136 using a fixed mount 146, such as described above with reference to FIGS. 2-5.

At 212 of the method, a second end 138 of the probe 108 is supported using a tensioning mount 148, as shown in FIG. 2. This may involve extending the end 138 through an opening 142 in the process vessel 114, and supporting the end 138 using a tensioning mount 148, such as described above with reference to FIGS. 2-5.

At 214 of the method, the resonant frequency of the probe 108 is adjusted using a tensioner 150 (FIG. 2) of the tensioning mount 148. Embodiments of step 214 include adjusting the tension 152 in the probe 108 using the tensioner as discussed above with reference to FIGS. 2-5. In some embodiments, the tension 152 of the probe 108 is increased using the tensioner 150, which increases the resonant frequency of the probe 108.

The adjusted resonant frequency of the averaging pitot tube probe 108 may be set to a value that is higher or lower than the wake frequency that is expected to form in the fluid flow 112 (FIG. 1). Thus, the probe 108 may be used in the fluid flow 112 without being subjected to high-magnitude oscillation forces at the resonant frequency of the probe 108. As a result, the operating life of the probe 108 in the fluid flow 112 is increased relative to a similarly structured probe having a resonant frequency that is close to or matches the wake frequency.

Some exemplary embodiments of the present disclosure apply the features described above using a probe 108 in the form of an averaging pitot tube probe 108 to other types of probes. In one example, the probe 108 may take the form of a shedding bar (e.g., bluff body or a vortex generator) of a vortex flow meter. This version of the probe 108 splits the flow into two paths causing vortices to shed from alternate sides of the probe 108 at a frequency that is linearly proportional to a velocity of the fluid flow 112. The one or more sensors 116 are used to detect this frequency, and output a corresponding signal 118, which, for example, can be processed using conventional techniques to determine the flow rate of the fluid, such as by the controller 130.

In yet another example, the probe 108 may take the form of a thermowell that is used to detect a temperature of the fluid 102. Here, one of the sensors 118 may be in the form of a temperature sensor 116T (e.g., thermocouple, resistive temperature detector, thermistor, etc.) that is housed within the thermowell, as indicated in FIG. 2. The temperature sensor 116T detects the temperature of the process fluid 102 through the thermowell, and provides an output signal 118 indicating the sensed temperature. The output signal 118 may be processed using conventional techniques to determine a temperature of the fluid 102, such as using the controller 130.

Accordingly, probe assemblies 106 formed in accordance with embodiments of the present disclosure include a probe 108 in the form of an averaging pitot tube probe, a vortex flow meter, and a thermowell.

Although the embodiments of the present disclosure have been described with reference to preferred embodiments, workers skilled in the art will recognize that changes may be made in form and detail without departing from the spirit and scope of the present disclosure.

What is claimed is:

1. An averaging pitot tube probe assembly for use in sensing a parameter of a fluid flow in a process vessel, the device comprising:
    an averaging pitot tube probe extending through the process vessel and including a first end extending through a first opening in the process vessel, and a second end extending through a second opening in the process vessel;
    a fixed mount securing the first end in a fixed position relative to the process vessel; and
    a tensioning mount including a tensioner attached to the second end of the probe and configured to adjust a tension in the probe and thereby alter a resonant frequency of the probe.

2. The assembly of claim 1, wherein the tensioner includes an adjustment mechanism comprising a first member having a threaded exterior surface and a second member having a threaded socket that receives the threaded exterior surface of the first member, rotation of the first member relative to the second member adjusts the tension in the probe.

3. The assembly of claim 2, wherein the first member is attached to the second end of the probe, and the second member extends distally from the first member and the second end of the probe.

4. The assembly of claim 2, wherein the second member is attached to the second end of the probe, and the first member extends distally from the second member and the second end of the probe.

5. The assembly of claim 2, wherein the tensioner includes a bias member configured to flex relative to the process vessel based on the tension in the probe.

6. The assembly of claim 5, wherein the bias member is selected from the group consisting of a leaf spring, a star washer and a coil spring.

7. The assembly of claim 5, wherein one of the first and second members extends through the bias member or is attached to the bias member.

8. The assembly of claim 5, wherein:
    the tensioning mount is attached to the process vessel and includes an interior cavity;
    the second end of the probe extends through the second opening and into the interior cavity of the tensioning mount; and
    the tensioner and the bias member are supported within the interior cavity of the tensioning mount.

9. A method of adjusting a resonant frequency of an averaging pitot tube probe of an industrial process sensing device for sensing a parameter of a process fluid flow in a process vessel, the method comprising:

supporting a first end of the probe extending through a first opening of the process vessel in a fixed position relative to the process vessel using a fixed mount;

supporting a second end of the probe extending through a second opening of the process vessel using a tensioning mount; and adjusting the resonant frequency of the probe by adjusting a tension of the probe using a tensioner of the tensioning mount.

10. The method of claim 9, wherein:

the tensioner includes an adjustment mechanism; and adjusting the tension of the probe comprises rotating a first member of the adjustment mechanism relative to a second member of the adjustment mechanism.

11. The method of claim 10, wherein the first member comprises a threaded exterior surface and the second member comprises a threaded socket, in which the threaded exterior surface of the first member is received.

12. The method of claim 11, wherein the first member is attached to the second end of the probe, and the second member extends distally from the first member and the second end of the probe.

13. The method of claim 11, wherein the second member is attached to the second end of the probe, and the first member extends distally from the second member and the second end of the probe.

14. The method of claim 11, further comprising flexing a bias member of the tensioner relative to the process vessel in response to adjusting the tensile force.

15. The method of claim 14, wherein the bias member is selected from the group consisting of a leaf spring, a star washer and a coil spring.

16. A probe assembly for use in sensing a parameter of a fluid flow in a process vessel, the assembly comprising:

a probe extending through the process vessel and including a first end extending through a first opening in the process vessel, and a second end extending through a second opening in the process vessel;

a fixed mount securing the first end in a fixed position relative to the process vessel; and a tensioning mount including a tensioner attached to the second end of the probe and configured to adjust a tension in the probe and thereby adjust a resonant frequency of the probe, the tensioner including:

an adjustment mechanism comprising a first member having a threaded exterior surface and a second member having a threaded socket that receives the threaded exterior surface of the first member; and a bias member configured to flex relative to the process vessel based on the tension in the probe.

17. The assembly of claim 16, wherein:

the tensioning mount is attached to the process vessel and includes an interior cavity;

the second end of the probe extends through the second opening and into the interior cavity of the tensioning mount; and the tensioner and the bias member are supported within the interior cavity of the tensioning mount.

18. The assembly of claim 17, wherein the first or second member of the adjustment mechanism is attached to or extends through the bias member.

19. The assembly of claim 18, wherein:

the first member is attached to the second end of the probe, and the second member extends distally from the first member and the second end of the probe; or the second member is attached to the second end of the probe, and the first member extends distally from the second member and the second end of the probe.

20. The assembly of claim 19, wherein the probe is selected from the group consisting of an averaging pitot tube, a shedder bar for a vortex flowmeter, and a thermowell containing a temperature sensor.

* * * * *